United States Patent [19]

Robbins

[11] 3,893,190

[45] July 1, 1975

[54] POWER-UP MASTER CLEAR CONTROL FLIP-FLOP

[75] Inventor: Douglas Alan Robbins, Saint Paul, Minn.

[73] Assignee: Control Data Corp., Minneapolis, Minn.

[22] Filed: June 10, 1974

[21] Appl. No.: 478,817

[52] U.S. Cl. .................................. 307/215; 307/290

[51] Int. Cl.$^2$ .......................................... H03K 3/286

[58] Field of Search ........... 307/203, 213, 215, 218, 307/289, 290

[56] References Cited

UNITED STATES PATENTS 3,676,710 7/1972 Jones .................................. 307/289

*Primary Examiner*—Siegfried H. Grimm

*Attorney, Agent, or Firm*—Edward L. Schwarz; Joseph A. Genovese

[57] ABSTRACT

Apparatus for supplying a master clear logic signal for an indefinite time upon application of power to it, and dropping the master clear signal upon receipt of a reset signal.

7 Claims, 3 Drawing Figures

POWER-UP MASTER CLEAR CONTROL FLIP-FLOP

BACKGROUND OF THE INVENTION

1. Field of the Invention

It is well known that when power is applied to digital logic equipment, the flip-flops forming a part of such apparatus do not first attain predictable states. Some may be in their set condition, others cleared. An individual flip-flop may come up in one condition one time, and the other condition the next. This unpredictability in the condition of the flip-flops after applying power to them is the result of such things as variations in manufacturing, temperature, rate of change of power voltage, and power voltage noise to mention some of the most major factors.

In general, digital apparatus is designed to operate with the flip-flops within it all in predetermined states before operation is initiated. Thus, it is necessary to supply a master clear signal to these flip-flops to place them in the required logic state prior to initiation of operation after application of power to the apparatus. It is necessary that provision be made for removing the master clear signal after the flip-flops have been preset, however, to avoid interfering with normal operation thereafter.

2. Description of the Prior Art

In the usual design to deform this clearing, the master clear signal is supplied by an R-C circuit whose initial output signal is a very low voltage, and as power voltage increases and the capacitor charges, reaches a higher voltage. The initial lower voltage approximates one logic state and is used to produce the master clear signal. The higher voltage reached when the capacitor is fully charged approximates the other logic state and in effect removes the master clear signal from the flip-flops within the apparatus. This apparatus has certain disadvantages. It necessitates the mounting of a capacitor, a device not usually present in digital logic circuits, on a circuit board. Because the packages in which capacitors are available are frequently larger than logic circuit packages, a special problem arises in locating the capacitor on closely spaced standard printed boards. Furthermore, the R-C circuit will not maintain a clear signal indefinitely, because the capacitor, as it charges, raises the signal output to approach the reset or non-master clear logic level. In fact, if power comes on too slowly, no master clear signal will ever be available, since capacitor voltage will "track" power voltage very closely. It is preferable that the master clear signal be of indefinite duration, and its removal be effected by the same activity which initiates normal operation of the apparatus.

BRIEF DESCRIPTION OF THE INVENTION

In many different types of logic circuitry, and particularly in so-called emitter-coupled logic (ECL) and transistor-transistor logic (TTL) power is supplied by a single voltage source. The two logic levels are indicated by two distinct voltage levels, both between ground and the supply voltage, one of course being closer than the other to ground and the other being closer to the supply voltage. For convenience, the logic level indicated by the voltage closer to ground, whether positive or negative with respect to ground will be considered the low or ZERO logic state, the other the high or ONE state. In the typical logic gate, and the only type to which the invention is known to apply, the impedance of a transistor connected between ground and the output terminal determines whether the low or high voltage state will be assumed. This, in turn, is controlled by the transistor control terminal, usually the base of the transistor involved. It is well known that these gates are available to provide the AND or OR function of their inputs, and possibly perform a predetermined inversion of the inputs or the output as well.

It is also well known that certain gates can be cross-connected, output of each to an input of the other, to form a flip-flop. This invention contemplates employing a flip-flop so formed of identical gates as the apparatus which generates the desired master clear signal. A steering impedance which is preferrably a resistor, is connected between ground and the output terminal of one logic gate. I have discovered that by suitably choosing the value of this impedance, as power is applied to the flip-flop, the steering impedance will cause the flip-flop to invariably achieve the low logic state. However, the steering impedance must not be so low that it interferes with normal flip-flop operation, i.e. it must allow resetting the flip-flop, after power voltage has risen to its normal level. Application of a suitable reset signal to an input terminal of the appropriate gate will cause the flip-flop state to change, or clear, and remain in that state until a set pulse is applied to the other logic gate, or power is removed from the flip-flop and reapplied. In a computer, for example, after power is applied, the appropriate output of this flip-flop can be supplied to the proper input terminal of flip-flops within the computer which must be preset for proper operation. The signal which initiates instruction processing can be applied to this flip-flop to reset it thereby preventing it from interfering with normal computer operation.

Accordingly, one purpose of this invention is to provide a master clear signal of indefinite duration and which closely approximates a normal logic level within the apparatus.

A second object is to utilize standard logic elements in providing the master clear signal, and thereby simplify inclusion of the device on standard printed circuit card assemblies.

Another object is to provide a signal which may be used to prevent reference to non-volatile memory until an initial master clear after power has been applied.

DESCRIPTION OF THE PREFERRED EMBODIMENTS

Figure 1:
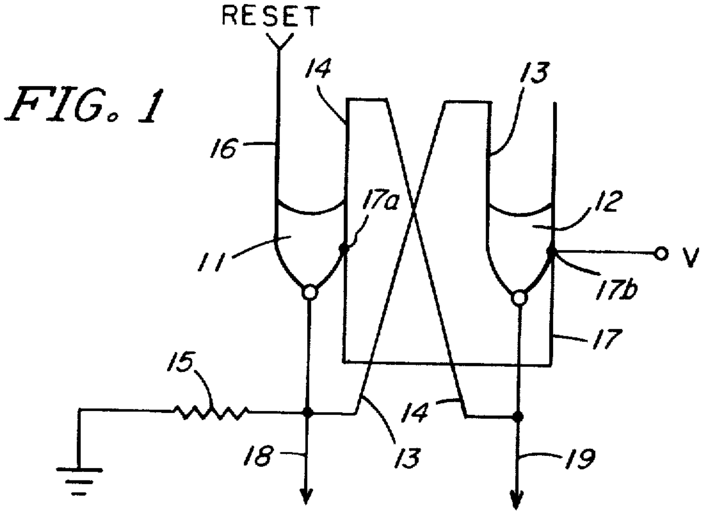
FIG. 1 is a logic schematic of a preferred embodiment of this invention.

Turning first to FIG. 1, logic gates 11 and 12 are OR gates having inverted outputs. Input 16 to gate 11 receives a reset signal from an external source, not shown. Input 14 of gate 11 received output 19 of gate 12. Inputs 13 of gate 12 receive output 18 of gate 11. Logic gates 11 and 12 are powered by the designed-for voltage V applied at power terminals 17*a* and 17*b* respectively. Gates 11 and 12 are designed to have as nearly as identical electrical characteristics as is conveniently possible. A preferred way to provide these identical characteristics is to employ micro-circuit logic and use two identical OR gates with inverted output which are contained within a single package. I have determined that such a pair of gates tend to be more electrically alike not only as to manufacturing variations, but also as to environmental effects when in use. In some logic families, desired gates may not be available in a single package. In such cases, by selecting the corresponding elements of the two gates to be substantially identical, an equivalent result may be achieved. Preferably, corresponding elements are contained in a single package.

Two different voltage levels are associated with these logic gates. Arbitrarily, the ZERO logic state will be associated with the voltage level closest to ground or zero volts. Similarly, the ONE logic state will be associated with the voltage level furthest from ground and closest to voltage V. As so defined, outputs 18 and 19 will be a ONE if either or both inputs of the associated gate 11 or 12 are ZERO. If the voltage level corresponding to a logic state of ONE is applied to both input terminals of either logic gate 11 or 12, the associated output 18 or 19 will be ZERO and hold that state for as long as the inputs are unchanged. Thus coupled, logic gates 11 and 12 form a flip-flop in accordance with well known practice.

Resistor 15 connects output 18 of gate 11 to ground. Resistor 15 is chosen to have a value low enough to cause the flip-flop to assume a predetermined state when power is applied, and high enough to allow the flip-flop to assume either of its states during operation while power is applied.

I have determined that a range of values for resistor 15 exists for many such logic families which will cause the flip-flop to invariably set with terminal 18 in the logic state closest to zero volts, ZERO, when power is applied. This characteristic, applied in a totally different manner, is discussed in U.S. Pat. No. 3,676,710, Low-Level Signal Detector Circuit, David A. Jones, patentee. This patent indicates that several different types of logic circuitry may be used to form gates 11 and 12. I have determined that operation is particularly effective for those circuits where output terminals 18 and 19 have internal connections to power by a passive device such as a resistor rather than by an active device such as a transistor. Such preferred circuits are exemplified by so-called emitter-coupled logic (ECL). The invention is also usable with transistor-transistor logic (TTL) but with less effectiveness. The application of these two circuit types to my invention will be discussed in detail in conjunction with FIGS. 2 and 3 below.

When power voltage has reached its operating value, the apparatus of which the flip-flop of FIG. 1 forms a part will perform a presetting of the critical flip-flops within it, using the output of gate 11 or 12 as the indicator that the clear operation is necessary. The output of this flip-flop may also be used to prevent access to non-volatile memory until the master clear operation is completed, by conditioning such memory access on the clear output from the flip-flop. Upon completion of the presetting operation, a reset signal is applied to reset terminal 16 of gate 11 to switch the condition of this flip-flop in the normal manner. The flip-flop of FIG. 1 may also be switched to its clear or reset state by a reset signal applied by the activity which initiates normal processing in the apparatus just preset, usually a manually operated switch.

Figure 2:
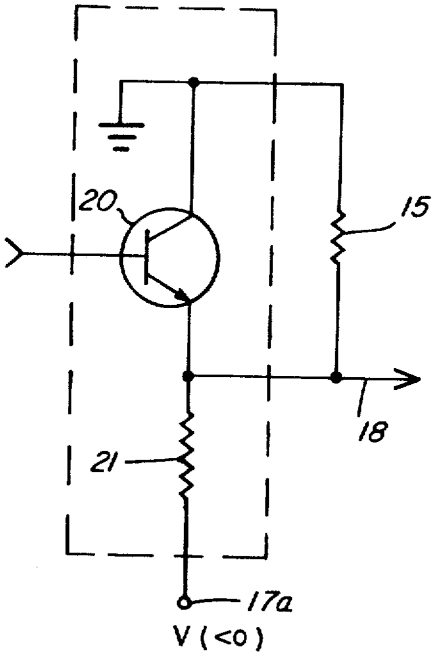
FIG. 2 is a circuit schematic of a logic gate usable as one of the gates in FIG. 1, and employing emitter-coupled logic circuitry.

FIG. 2 displays the output circuit of an ECL gate within the dotted line rectangle, and employed as the output of gate 11 in FIG. 1. Gate 12 is an identical gate having identical output circuitry and individual elements substantially identical to those of gate 11. Resistor 15 is shown connected between ground and output terminal 18. As voltage rises on terminals 17*a* and 17*b* over a period of time, transistor 20 and the corresponding transistor in gate 12 have nearly identical transconductance characteristics because of their preselected similarity. Hence voltage at terminal 18 will be nearer ground at all times while the power voltage is rising to operating level, than voltage at terminal 19, because of the presence of resistor 15. So long as the value of resistor 15 is small enough to hold voltage at terminal 18 closer to ground than at terminal 19 regardless of inevitable small variations between each pair of corresponding circuit elements, the flip-flop will always set on power-up with a logical ZERO at terminal 18.

Figure 3:
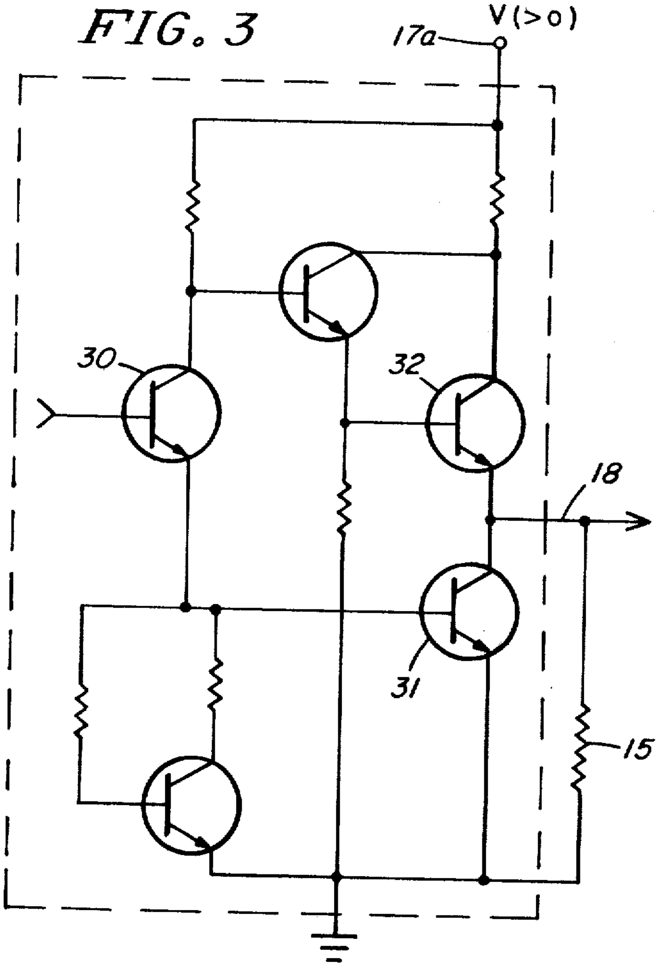
FIG. 3 is a circuit diagram of a logic gate usable as one of the gates in FIG. 1 and employing transistor-transistor logic.

Similarly, in FIG. 3 the circuit within the dotted line rectangle shown forms the inversion of the signal presented at terminal 30 and can be considered as the inverter of gate 11. Resistor 15 is in parallel with transistor 31. As power is applied to terminal 17*a*, transistors 31 and 32 have indeterminate transconductance. Corresponding transistors have essentially identical transconductance, and the result is that with resistor 15 grounding it, terminal 18 will have voltage closer to ground than terminal 19 while power increases. Resistor 15 pulls terminal 18 to ground which will cause a low voltage to be applied to the terminal corresponding to terminal 30 of the inverter comprising a part of gate 12. This results in a ZERO and ONE finally at terminals 18 and 19 respectively.

In selecting the minimum value of resistor 15, two factors are involved. To provide some margin of safety, it is preferable that resistor 15 be chosen to be slightly above these minimum values. The first consideration is that resistor 15 not impose such a great power load on the gate that the gate itself be damaged. Secondly, it is necessary that resistor 15 not reduce the voltage of output 18 when gate 11 is producing its ONE output (the flip-flop in reset condition) so much that the voltage can not function satisfactorily as the desired logic level. It is believed that those having ordinary skill in the art can analyze individual circuit diagrams of the various gates which may be utilized in this apparatus, and determine appropriate values for resistor 15 by application of known electrical considerations.

A simple rule for selection of the value for resistor 15 is based on the maximum permissable current drain from an individual logic gate selected, at the voltage within the ONE logic level voltage range, closest to ground. The maximum current drain is included in the specification sheet for most of such circuits and is based on the current drain being for loads comprising logic circuits. The voltage for a logical ONE, being furthest from ground, creates the greatest current drain through resistor 15. Since the voltage for a logical ONE is also specified, dividing this voltage by the maximum current yields a suitable value for resistor 15. As an example, assuming the circuit of FIG. 2 has a maximum specified current drain of 4 ma. and a logical ONE value of −1.8 v., a suitable value for resistor 15 is 450 ohms. (1.8 ÷ 0.004). In all likelihood, a greater value than this will work equally well, although too high a value for resistance 15 will as mentioned supra, prevent reliable setting of the flip-flop to the desired state. I believe that those skilled in the art are familiar with the various types of logic circuits available and can easily determine appropriate values for resistor 15 for the particular circuit involved.

Having thus described my invention, what I claim is:

1. Apparatus providing a predetermined master clear logic signal reaching a predetermined one of two distinct logic states upon lifting the apparatus power terminal voltage to operating level, and the other logic state responsive to a reset logic signal following power voltage reaching operating level, comprising a. a flip-flop whose output is the master clear logic signal, comprising first and second logic gates of substantially identical electrical characteristics, each of the type having a transistor-controlled output achieving the logic state whose voltage is closest to 0 volts when the transistor impedance is lowest, each powered by a single common source, and each having at least two inputs, one input of one gate receiving the reset signal and responsive thereto setting the flip-flop to the condition wherein the logic state of the first gate is that represented by the voltage level closest to zero; and b. a steering impedance connecting the output of the second logic gate to ground, and having a sufficiently low value to predispose the flip-flop to invariably reach the condition wherein the logic state of the second gate is that represented by voltage closest to zero, and having sufficiently high value to allow the output voltage to attain acceptable logic levels and prevent overloading of the logic gates.

2. The apparatus of claim 1, wherein the two gates are contained in a single package.

3. The apparatus of claim 1, wherein the gates are of the emitter-coupled logic type.

4. The apparatus of claim 3, wherein the impedance is a resistor.

5. The apparatus of claim 3, wherein the impedance is a resistor of value substantially equal to the minimum specification voltage for the logic level whose voltage range is furthest from 0 divided by the maximum recommended current drain for logic gate loads.

6. The apparatus of claim 1, wherein identically corresponding elements of the same two gates comprising the flip-flop are contained in a single package.

7. The apparatus of claim 1, wherein the impedance is a resistor of value substantially equal to the minimum specification voltage for the logic level whose voltage range is furthest from 0 divided by the maximum recommended current for logic gate loads.

* * * * *